United States Patent
Taska

[11] 3,928,924
[45] Dec. 30, 1975

[54] LEARNING KIT FOR CHILDREN WITH LEARNING DISABILITIES

[76] Inventor: Eileen R. Taska, 14 Wildflower Trail, Greenwich, Conn. 06830

[22] Filed: May 3, 1974

[21] Appl. No.: 466,544

[52] U.S. Cl.............................................. 35/37; 35/71
[51] Int. Cl.².......................................... G09B 11/04
[58] Field of Search.......... 35/35 R, 35 H, 35 J, 36, 35/37, 26, 69–73, 27, 28

[56] References Cited
UNITED STATES PATENTS

| | | | |
|---|---|---|---|
| 602,222 | 4/1898 | Kimble | 35/35 R X |
| 1,206,795 | 12/1916 | Barrington | 35/26 |
| 1,754,738 | 4/1930 | Calle | 35/26 X |
| 2,747,298 | 5/1956 | Sullivan | 35/26 |
| 3,618,231 | 11/1971 | Nason | 35/35 J |

FOREIGN PATENTS OR APPLICATIONS

| | | | |
|---|---|---|---|
| 6,064 | 1915 | United Kingdom | 35/73 |
| 303,304 | 2/1955 | Switzerland | 35/35 R |

*Primary Examiner*—Wm. H. Grieb

[57] ABSTRACT

A learning kit is provided which is particularly useful in the teaching of children suffering from learning disabilities of the type which are evidenced by the fact that the child displays very poor fine motor skills and although of an age at which the ability to do so should exist is unable to read and can not identify the letters of the alphabet. The subject kit consists of a multiplicity of individual cards arranged so as to comprise a set thereof. Each of the cards in a set has provided on at least one face thereof the outline of one of the letters of the alphabet. The outline of the letter is formed by positioning a plurality of balls which are suitably spaced relative to each other in a preselected pattern. The center of each of the balls is colored a different color so that no two balls on the same card are of the same color. A reading script is provided which is designed to be employed with each card in the set. Namely, with a given card before him, the child is told a story about that card. During the story, the child is instructed to interconnect the balls in a prescribed fashion. More particularly, starting with a particular ball which is identified by its color, lines are drawn by the child to the other balls in accord with a preselected sequence. This procedure is followed in turn for each of the cards in the set. Thus, by utilizing the ability of the child to recognize colors, he is taught to form the letters of the alphabet and to recognize their shapes so as to be able to distinguish therebetween.

8 Claims, 16 Drawing Figures

LEARNING KIT FOR CHILDREN WITH LEARNING DISABILITIES

BACKGROUND OF THE INVENTION

As evidenced by reference to the prior art, it has long been known to provide teaching aids for use by a teacher in instructing her students. Such teaching aids have been of various types. However, irrespective of the particular form of construction which the teaching aids may embody or the manner in which they are intended to be used, the objective in employing such teaching aids nevertheless remains the same. Namely, the teaching aids are intended to be utilized as a means of assisting the teacher in better performing the task of teaching her students.

Although significant results have been achieved by employing some of the prior art forms of teaching aids, such aids have generally been designed to be used by a teacher instructing a class of so-called normal students, i.e., children without learning disabilities. More particularly, very little attention has been paid in the past to developing teaching aids particularly suited for use in the teaching of children suffering from learning disabilities. Moreover, it has been found that even the prior art forms of teaching aids which have proven effective when employed for purposes of assisting in the instruction of children who do not have learning disabilities are largely ineffective when attempts are made to utilize them in the same manner with children who do suffer from learning disabilities.

There has thus existed a need to provide teaching aids which are specifically designed to meet the needs of those teachers who work in the field of teaching children having learning disabilities. The difficulty encountered in attempting to teach such children stems primarily from the fact that conventional teaching techniques have been found not to be effective with such children. Generally speaking, this is because these children do not have the basic skills commonly possessed by children of their same age group. Another difficulty resides in the fact that different children possess different types of learning disabilities. Although difficulty is sometimes encountered in determining the nature of the learning disability from which a child suffers, the most difficult problem which must be overcome is that of devising a teaching process which will be effective, when employed, to teach the child. Concomitant with this is determining the level of foundation that the child has for learning.

For example, a need was found to exist to provide some form of training aid which would be effective when employed by a teacher for purposes of teaching a child whose only foundation was the ability to recognize colors. This is perhaps best exemplified by reference to the situation of one particular child who had a firm knowledge of colors but at the age of six years and eight months was found to have very poor fine motor skills. In addition, this child could not read and was unable to identify the letters of the alphabet. The so-called normal child, i.e., without learning disabilities, of the same age is capable of some degree of reading. Inherent in this capability is an ability to recognize the letters of the alphabet. According to well-established norms, a child without learning disabilities of the same age should be able to reproduce all of the following forms: vertical line, horizontal line, circle, vertical-horizontal cross, right oblique line, square, left oblique line, oblique cross, triangle, and open square and circle. The subject child was capable of reproducing only the vertical line and the right oblique line. Therefore, the child had not the motor skills which are a prerequisite to even writing the letters of the alphabet. Consequently, notwithstanding the fact that a multiplicity of teaching aids of various types existed in the prior art, it was found that a need still existed to develop a teaching aid which would be effective when used to teach children having learning disabilities of the type characterized previously hereinabove.

Accordingly, it is an object of the present invention to provide a learning kit capable of being utilized as a teaching aid by a teacher in instructing her students.

It is another object of the present invention to provide such a learning kit which is particularly suited to be used as a teaching aid to assist in teaching children with learning disabilities.

A still further object of the present invention is to provide such a learning kit which is employable as a teaching aid to teach those children who have learning disabilities but who have a firm knowledge of colors.

Still another object of the present invention is to provide such a learning kit which is capable of being used as a teaching aid by teachers in instructing children who have learning disabilities which are evidenced by the fact that the children have very poor fine motor skills, and are unable to read or to identify the letters of the alphabet.

Yet an object of the present invention is to provide such a learning kit which has proven capable of providing very effective results when employed by a teacher to teach children having learning disabilities, but a firm knowledge of colors, how to recognize the letters of the alphabet as well as to actually draw the letters.

Yet another object of the present invention is to provide such a learning kit employable as a teaching aid for children with learning disabilities which is inexpensive to manufacture, is easy to employ, and is relatively durable thereby to provide a relatively long operating life.

SUMMARY OF THE INVENTION

It has now been found that the foregoing and related objects can be readily attained in a learning kit which is particularly useful as a teaching aid in the teaching of children suffering from learning disabilities of the type which are evidenced by the fact that the child displays very poor fine motor skills, and although at an age at which the ability to do so should exist is unable to read and can not identify the letters of the alphabet. The learning kit consists of a multiplicity of cards which are arranged in a set. Each of the cards in the set has provided thereon on at least one face thereof the outline of one of the letters of the alphabet. The outlines of the letters are formed through the use of a plurality of balls which are positioned in a predetermined pattern. The center of each of the balls is colored a different color so that no two balls on the same card are of the same color. A reading script is provided which is designed to be employed with each card in the set. Namely, with a given card before him, the child is told a story about that card. During the story, the child is instructed to interconnect the balls in a prescribed sequence. More specifically, starting with a particular ball which is identified by its color, lines are drawn by the child to the other balls in a prescribed sequence. This procedure is followed in turn for each of the cards in the set. Thus, by utilizing the ability of the child to recognize colors, he is taught to form the letters of the alphabet and to recognize their shapes so as to be able to distinguish therebetween.

In accord with the preferred embodiment of the invention, the subject learning kit consists of 26 cards each having provided thereon on one face thereof a different letter of the alphabet. Each of the cards consists of a substantially rigid member having at least one surface thereof suited for inscribing. Preferably, each of the cards is formed of a suitable plastic material operable to provide a substantially rigid, wear-resistant surface. The balls which are provided on each of the cards for purposes of designating the outline of the letters are each comprised of a border and a colored center. The border functions to define a circle which in turn constitutes the circumference of the ball. The center of each of the balls is colored a different color than the color of the material from which the card is made so as to provide a contrast therewith. The border as well as the colored center of each of the balls is preferably permanently depicted on the card through the use of any suitable means such as by imprinting the balls on the card, or by printing them thereon, or by employing decals which are permanently affixed to the surface of the card by means of a suitable adhesive. The cards are intended to be reusable. Consequently, the lines which are drawn between the balls whereby to interconnect the latter so as to form a completed letter are preferably made by means capable of being erased, i.e., easily removed from the surface of the card. To this end, the lines may be drawn by means of a crayon, or any other form of suitable conventional writing implement which is capable of making a line of a color which will contrast with the color of the surface of the card which bears the outline of the letter. Each of the different reading scripts is basically similar in that the primary differences therebetween are occasioned by the need to provide different instructions to the child for each letter in order to enable him to complete the letter.

DETAILED DESCRIPTION OF THE ILLUSTRATED EMBODIMENT

Figure 1:
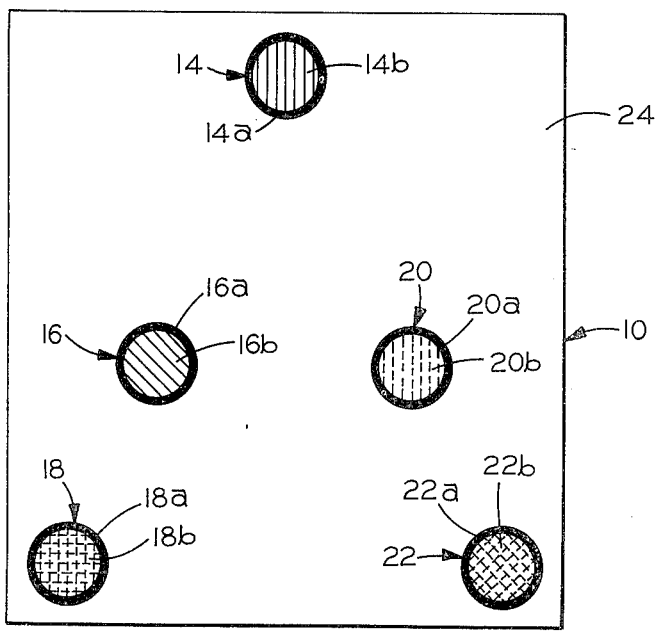
FIG. 1 is a top plan view of one of the cards of a set thereof of a learning kit constructed in accordance with the present invention which bears the outline of the letter A of the alphabet.
Figure 4:
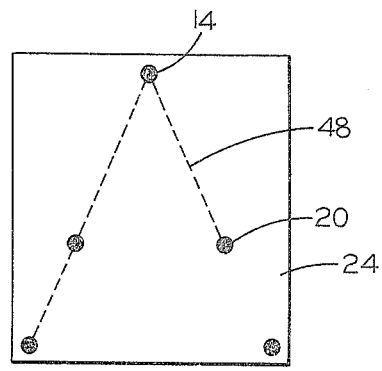
FIG. 4 is a top plan view on a reduced scale of the card of FIG. 1, illustrating in broken lines the first through third lines which are drawn thereon by a child in the process of completing the letter.
Figure 2:
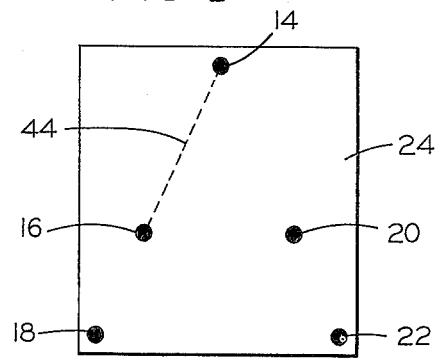
FIG. 2 is a top plan view on a reduced scale of the card of FIG. 1, illustrating in broken lines the first line which is drawn thereon by a child in the process of completing the letter.

Referring now to the drawings, and more particularly FIG. 1 thereof, there is depicted therein one of the cards, generally designated by reference numeral 10, which when combined with 25 other cards comprise a set (not shown) thereof. Such a set along with a reading script (not shown) which is designed to be employed therewith constitutes the learning kit of the present invention. Inasmuch as the construction of each of the cards in a set is the same except for the outline of the letter which appears on one of the faces thereof, it has not been deemed necessary for purposes of obtaining an understanding of the invention to depict in the drawings all of the 26 cards which together comprise a set thereof. Instead it has been deemed sufficient to illustrate in the drawings and describe herein only two of the 26 cards and more specifically, the card 10 depicted in FIG. 1 of the drawings which bears the outline of the first letter, i.e., the letter A, of the alphabet and the card 12 depicted in FIG. 7 of the drawings which bears the outline of the second letter, i.e., the letter B, of the alphabet. It is to be understood that each of the remaining 24 cards (not shown) embodies the same construction as the cards 10 and 12 differing therefrom only in the outline of the particular letter which it bears on one of its faces.

Turning now to a detailed description of the nature of the construction of the card 10 shown in FIG. 1 of the drawings, the card 10 as depicted therein is generally square in configuration. Although the card 10 has been illustrated as being substantially square, it is to be understood that the card 10 may take other shapes without departing from the essence of the invention. In accord with one embodiment of the invention, the card 10 is either entirely made from a suitable plastic material capable of providing a substantially rigid, wear-resistant surface on which balls 14, 16, 18, 20 and 22, to which further reference will be had hereinafter, are capable of being provided, or is at least provided with one surface 24, i.e., face thereof, which is plastic-coated and on which the balls 14, 16, 18, 20 and 22 are provided. By utilizing plastic to form the card 10, the operating life thereof is significantly extended. This is particularly advantageous wherein it is desired to make repetitive usage of the card 10. On the other hand, if so desired, the card 10 could also be formed from other types of material such as cardboard, paper, etc. having at least one surface thereof capable of being written upon. In general, cards formed of the latter types of material though being more economical to manufacture do not provide the long operating life which characterizes cards formed from plastic.

Continuing with the description of the card 10, the latter has provided on one face thereof, i.e., surface 24, a plurality of balls 14, 16, 18, 20 and 22. The balls 14, 16, 18, 20 and 22 are positioned thereon so as to form the outline of the first letter of the alphabet, i.e., the letter A. The balls 14, 16, 18, 20 and 22 may be provided on the surface 24 of the card 10 through the use of any suitable means such as for example by being imprinted thereon, by being painted thereon, by being placed thereon in the form of decals, etc. As best understood with reference to FIG. 1 of the drawings, each of the balls 14, 16, 18, 20 and 22 consists of a border 14a, 16a, 18a, 20a and 22a, respectively, and a colored center 14b, 16b, 18b, 20b and 22b, respectively. The fact that the center of each of the balls 14, 16, 18, 20 and 22 is colored has been schematically shown in FIG. 1 of the drawings by employing the symbols which have been approved for use for this purpose. However, in order to maintain clarity of illustration in the drawings, the aforereferenced symbols have not been utilized in FIGS. 2–6 because of the fact that the balls 14, 16, 18, 20 and 22 are illustrated therein on a reduced scale.

With reference further to the balls 14, 16, 18, 20 and 22, the borders 14a, 16a, 18a, 20a and 22a, respectively thereof are utilized merely to define the circumference of the corresponding ball. Insofar as concerns the color of each of the balls 14, 16, 18, 20 and 22, the center 14b of ball 14 is colored red, the center 16b of ball 16 is colored green, the center 18b of ball 18 is colored yellow, the center 20b of ball 20 is colored purple, and the center 22b of ball 22 is colored orange. Although in accord with the illustrated embodiment of the invention, the balls 14, 16, 18, 20 and 22 are colored in the aforedescribed manner, it is to be understood that the centers 14b, 16b, 18b, 20b and 22b of the balls 14, 16, 18, 20 and 22, respectively, could be colored other different colors without departing from the essence of the invention. The important consideration in this regard is not the particular color which is employed for each of the balls 14, 16, 18, 20 and 22 but rather that each of the balls 14, 16, 18, 20 and 22 is colored a different color relative to each other and that the colors utilized for the balls 14, 16, 18, 20 and 22 contrast with the surface 24 of the card 10 on which the balls 14, 16, 18, 20 and 22 are provided.

Completing the description of the nature of the card 10, the latter has a thickness which will generally vary depending on the type of material from which the card 10 is formed. In this connection, it is desirable that the card 10 possess a sufficient degree of rigidity so as to impart suitable handling qualities thereto as well as to render it easier for the child to draw the lines thereon required for purposes of interconnecting the balls 14, 16, 18, 20 and 22 so as to provide a completed letter A.

Figure 7:
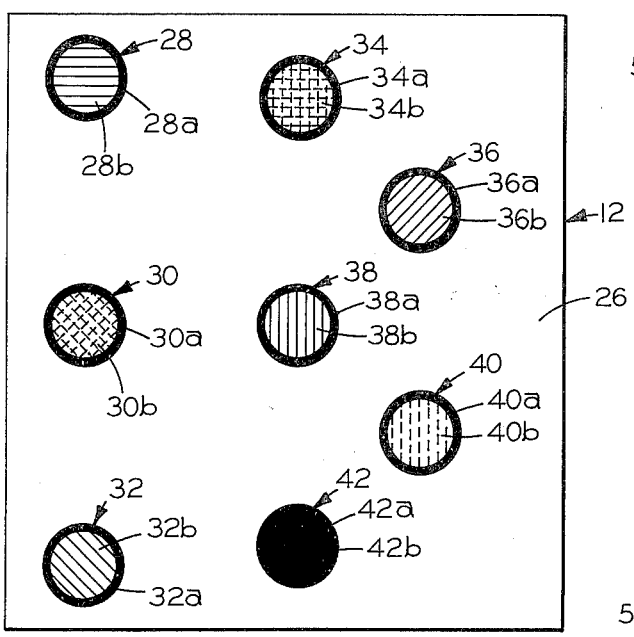
FIG. 7 is a top plan view of another of the cards of a set thereof of a learning kit constructed in accordance with the present invention which bears the outline of the letter B of the alphabet.
Figure 8:
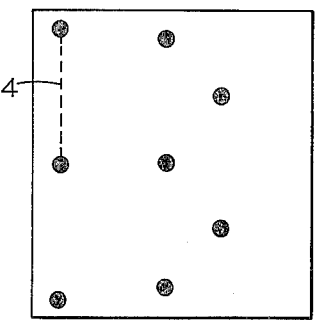
FIG. 8 is a top plan view on a reduced scale of the card of FIG. 7, illustrating in broken lines the first line which is drawn thereon by a child in the process of completing the letter.
Figure 9:
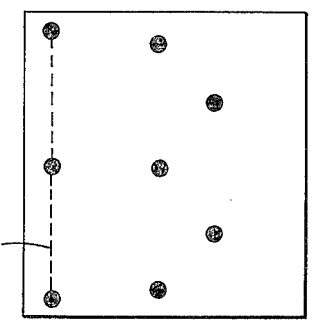
FIG. 9 is a top plan view on a reduced scale of the card of FIG. 7, illustrating in broken lines the first and second lines which are drawn thereon by a child in the process of completing the letter.
Figure 10:
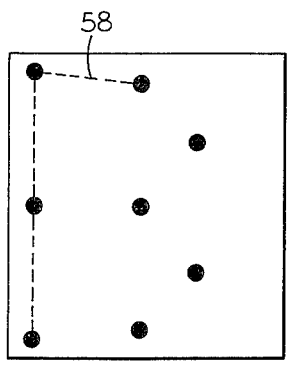
FIG. 10 is a top plan view on a reduced scale of the card of FIG. 7, illustrating in broken lines the first through the third lines which are drawn thereon by a child in the process of completing the letter.
Figure 11:
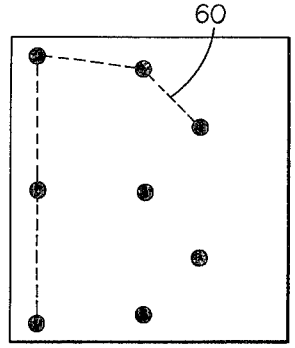
FIG. 11 is a top plan view on a reduced scale of the card of FIG. 7, illustrating in broken lines the first through the fourth lines which are drawn thereon by a child in the process of completing the letter.
Figure 12:
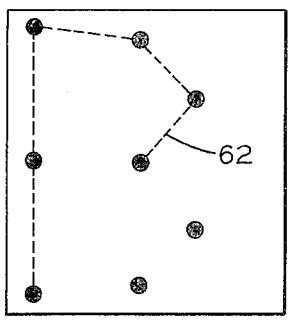
FIG. 12 is a top plan view on a reduced scale of the card of FIG. 7, illustrating in broken lines the first through the fifth lines which are drawn thereon by a child in the process of completing the letter.
Figure 13:
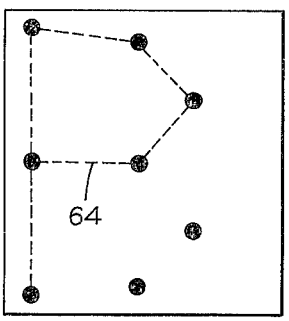
FIG. 13 is a top plan view on a reduced scale of the card of FIG. 7, illustrating in broken lines the first through the sixth lines which are drawn thereon by a child in the process of completing the letter.
Figure 14:
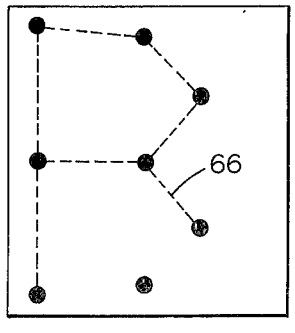
FIG. 14 is a top plan view on a reduced scale of the card of FIG. 7, illustrating in broken lines the first through the seventh lines which are drawn thereon by a child in the process of completing the letter.
Figure 15:
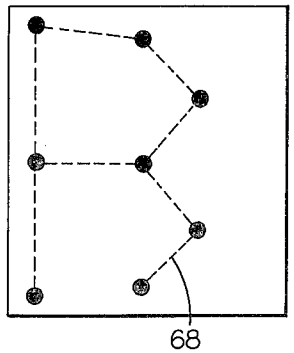
FIG. 15 is a top plan view on a reduced scale of the card of FIG. 7, illustrating in broken lines the first through the eighth lines which are drawn thereon by a child in the process of completing the letter.
Figure 16:
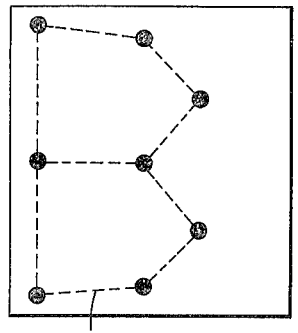
FIG. 16 is a top plan view on a reduced scale of the card of FIG. 7, illustrating the letter completed thereon.

Turning next to FIG. 7 of the drawings, there is illustrated therein another card, i.e., card 12, of the set thereof which is included in the learning kit of the present invention. The card 12 bears on one surface, i.e., the face 26 thereof, the outline of the letter B of the alphabet. The letter B is formed thereon through the use of the balls 28, 30, 32, 34, 36, 38, 40 and 42. Inasmuch as the nature of the construction of the card 12 is the same as that of the card 10, which was described previously hereinabove, except for the fact that the card 12 bears the outline of the letter B which is formed by the balls 28, 30, 32, 34, 36, 38, 40 and 42 rather than the letter A in the case of the card 10 which is formed on the latter through the use of the balls 14, 16, 18, 20 and 22, it is not deemed necessary to reiterate at this point with respect to the construction of the card 12 all that was set forth above with regard to the construction of the card 10. It will suffice merely to point out that the card 12 may be formed from any suitable material such as plastic, cardboard, paper, etc. and that the balls 28, 30, 32, 34, 36, 38, 40 and 42 may be provided on the surface 26 of the card 12 by being imprinted thereon, by being painted thereon, through the use of decals which are permanently secured to the surface 26 by means of a suitable adhesive, etc.

Referring again to FIG. 7 of the drawings, each of the balls 28, 30, 32, 34, 36, 38, 40 and 42 consist of a border 28a, 30a, 32a, 34a, 36a, 38a, 40a and 42a, respectively, and a colored center 28b, 30b, 32b, 34b, 36b, 38b, 40b and 42b, respectively. Obviously as in the case of the balls 14, 16, 18, 20 and 22 of the card 10, the balls 28, 30, 32, 34, 36, 38, 40 and 42 of the card 12 could also be colored different colors without departing from the essence of the invention as long as no two balls on the card 12 are of the same color and that the colors selected for use for the balls 28, 30, 32, 34, 36, 38, 40 and 42 contrast with the color of the surface 26. The card 12 is also illustrated in each of FIGS. 8–16 of the drawings. However, in the latter figures, as in the case of the illustration of the card 10 in FIGS. 2–6, the centers of the balls 28, 30, 32, 34, 36, 38, 40 and 42 have not been depicted as being colored because of the fact that the size of the balls 28, 30, 32, 34, 36, 38, 40 and 42 as found therein renders it very difficult to do so while at the same time attempting to maintain clarity of illustration in the drawings.

With reference further to the balls 28, 30, 32, 34, 36, 38, 40 and 42, the borders 28a, 30a, 32a, 34a, 36a, 38a, 40a and 42a, respectively thereof are utilized merely to define the circumference of the corresponding ball. Insofar as concerns the color of each of the balls 28, 30, 32, 34, 36, 38, 40 and 42, the center 28b of ball 28 is colored blue, the center 30b of ball 30 is colored orange, the center 32b of ball 32 is colored green, the center 34b of ball 34 is colored yellow, the center 36b of ball 36 is colored brown, the center 38b of ball 38 is colored red, the center 40b of ball 40 is colored purple, and the center 42b of ball 42 is colored black.

Figure 5:
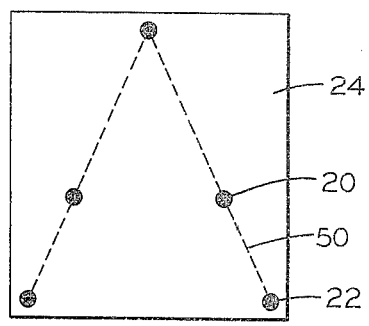
FIG. 5 is a top plan view on a reduced scale of the card of FIG. 1, illustrating in broken lines the first through fourth lines which are drawn thereon by a child in the process of completing the letter.
Figure 3:
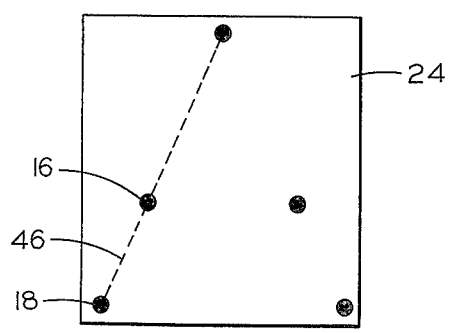
FIG. 3 is a top plan view on a reduced scale of the card of FIG. 1, illustrating in broken lines the first and second lines which are drawn thereon by a child in the process of completing the letter.
Figure 6:
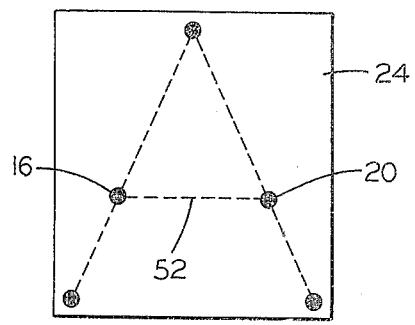
FIG. 6 is a top plan view on a reduced scale of the card of FIG. 1, illustrating in broken lines the letter completed thereon.

Turning now to a description of the preferred method of utilizing the cards 10 and 12 and by analogy the remaining 24 cards (not shown) each of which bears on one of its surfaces one of the remaining 24 letters of the alphabet, these cards 10 and 12 as well as the remaining 24 cards were developed to form a set which in turn are included in the learning kit of the present invention. More specifically, the learning kit of the present invention was specifically developed for a child who could not ready and could not identify the letters of our alphabet. This child in addition had great difficulty writing. His only foundation was a firm knowledge of colors. Utilizing the latter as a basis, the learning kit of the present invention was devised. Namely, for each individual letter of the alphabet a card was provided on which a multiplicity of balls were so arranged that when properly connected they would form a given letter. In addition, a reading script was produced to accompany each of the cards. By way of illustration, utilizing the card 10 as an example the following sets forth the manner in which the card 10 of the learning kit of the present invention is employed by a teacher in teaching a child having learning disabilities whereby he can not read or identify the letters of the alphabet but does possess a firm knowledge of colors. Thus, with the card 10 before him, the following story is told to the child by the teacher. Mr. Red would like to go to Mr. Green's house. Can you make a path for him At this point, the child starting with the ball with the red center, i.e., ball 14, draws on the surface 24 of the card 10 by means of any suitable conventional form of writing implement such as a crayon, pencil, etc., a path from ball 14 to ball 16. Such a path has been depicted in FIG. 2 of the drawings through the use of the broken line designated by reference numeral 14. Then, the child is told that Mr. Green would like to go to Mr. Yellow's house. Moreover the child is told to see if he can make a path from Mr. Green's house to Mr. Yellow's house. The latter path is schematically shown in FIG. 3 by the broken line 46. Thereafter, the teacher tells the child that Mr. Red also wants to be able to get to Mr. Purple's house. The child is asked if he can make that path. Thus, beginning with the ball 14, i.e., Mr. Red's house the child draws a path to the purple ball, i.e., ball 20. This path appears as broken line 48 in FIG. 4 of the drawings. Now the child is told that Mr. Purple decides that he wants to visit Mr. Orange, so let's make a path for him. As shown in FIG. 5 by the broken line 50, the child therefore draws a line between ball 20, i.e., Mr. Purple's house and ball 22, i.e., Mr. Orange's house. Finally, the child is told that everyone is happy except for Mr. Green who would really like a special path over to Mr. Purple's house. Accordingly, the child draws a path which is symbolized by the broken line 52 in FIG. 6 from Mr. Green's house, i.e., the ball 16 with the green center to Mr. Purple's house, i.e., the ball 20 with the purple center. It can therefore be seen that by following the instructions set forth above the child is taught to complete the letter A. In this way, by repeating the above procedure a number of times the child is gradually taught not only to recognize what he has produced, i.e., the letter A but also is taught how to write the letter A.

The card 12 which bears the outline of the letter B thereon is employed in the same fashion as the card 10 for the purpose of teaching a child who can not read or identify the letters of the alphabet and who has difficulty writing but who has a firm knowledge of colors, how to recognize as well as write the letter B. More specifically, employing a reading script in conjunction with the card 12, the child is told a story similar to that set forth in the preceding paragraph which is designed to be used with the card 10. Following the instructions given in the story, the child is guided in a step-by-step fashion to draw paths between the various colored balls 28, 30, 32, 34, 36, 38, 40 and 42 which together form the outline of the letter B. This step-by-step procedure is depicted in FIGS. 8–16 of the drawings wherein each succeeding one of these figures differs from the preceding figure in that an additional line has been added therein until in FIG. 16 the completed letter B is produced. Each of these lines corresponds to one of the paths which the child is told to draw on the card 12, and have been identified in FIGS. 8–16 by the reference numerals 54, 56, 58, 60, 62, 64, 66, 68 and 70, respectively.

The reading script which is employed in conjunction with each of the cards in the set of the learning kit of the present invention varies of course, according to letter, color of individual ball and direction in which it is desired to have the child's stroke go. The direction of the stroke from colored ball to colored ball is significant. For example, insofar as concerns the card 10 and the letter A thereon, regardless of the colors used the child must go from the apex of the A to the medial colored ball of the left leg and then to the lowest colored ball of that leg. Beginning again at the apex, the child must go to the medial colored ball of the right leg and then to the lowest colored ball of that same leg. Finally, the left medial colored ball must be connected to the right medial colored ball. Likewise, with regard to the card 12 and the letter B depicted thereon, the child must follow the sequence which is shown in FIGS. 8–16 of the drawings. The direction of the stoke must be guided always so that when the letters are well learned in this form, the child can then write them himself without the colored ballls as guide posts. If properly utilized and learned, these strokes will be appropriate for proper letter formation.

Although only one embodiment of a learning kit constructed in accordance with the present invention has been described hereinabove and shown in the drawings, it is to be understood that modifications in the construction thereof may be made thereto by those skilled in the art without departing from the essence of the invention. In this connection, some of the modifications which can be made in the learning kit of the present invention have been alluded to hereinabove while others will become readily apparent to those skilled in the art when exposed to the present description and illustration of the construction of the subject learning kit. For example, it has been set forth hereinabove that the cards may be made from different types of material. Also, it has been noted previously that the colored balls may be provided on the cards by a variety of different means. In addition, reference has been had to the fact that the text of the reading script which is utilized with each of the cards will vary depending on the nature of the letter which is on the card and the colors of the balls which are employed to form the outline of the letter. Moreover, although the cards 10 and 12 have been shown as bearing the outline of capital letters, it is to be understood that by substituting on the cards 10 and 12, the outline of letters A and B, respectively, in lower case and by doing likewise with regard to other remaining 24 cards, a learning kit could be provided for teaching a child having learning disabilities how to identify as well as write the letters of the alphabet in lower case, without departing from the essence of the invention. Similarly, a learning kit could be provided for teaching a child having learning disabilities to recognize the shape as well as write the numerals from 0 to 9 by providing a set of cards each bearing thereon the outline of a different one of the aforesaid numerals and with the outline being formed by means of a multiplicity of different colored balls.

Thus, it can be seen that the present invention provides a novel and improved learning kit capable of being utilized as a teaching aid by a teacher in instructing her students. Moreover, in accord with the present invention a learning kit has been provided which is particularly suited to be used as a teaching aid to assist in teaching children with learning disabilities. The learning kit of the present invention is employable as a teaching aid to teach those children who have learning disabilities but who have a firm knowledge of colors. Furthermore, in accordance with the present invention a learning kit is provided which is capable of being used as a teaching aid by teachers in instructing children who have learning disabilities which are evidenced by the fact that the children have very poor fine motor skills, and are unable to read or to identify the letters of the alphabet. Also, a learning kit has been provided in accord with the present invention which has proven capable of providing very effective results when employed by teachers to teach children having learning disabilities, but a firm knowledge of colors, how to recognize the letters of the alphabet as well as to actually draw the letters. Finally, in accord with the present invention a learning kit has been provided which is employable as a teaching aid for children with learning disabilities which is inexpensive to manufacture, is easy to employ, and is relatively durable thereby to provide a relatively long operating life.

Having thus described the invention, I claim:

1. A learning kit for use by a learning disabilities teacher to teach children having learning disabilities to recognize and to correctly form by writing alphabetical and numerical characters comprising:
  a. a multiplicity of individual cards constituting a set thereof, each one of said set of individual cards consisting of a planar member having at least one surface thereof suitable for writing thereon, said one surface of each one of said set of individual cards having the image of a set of individual, differently colored symbols comprising a circle consisting of a border defining the circumference of the circle and a colored center, each one of said set of individual, differently colored symbols being located on said one surface of the corresponding one of said set of individual cards in spaced relation relative to each other to form thereon the outline of a preselected character selected from the alphabetical and numerical characters, said set of individual, differently colored symbols on said one surface of the corresponding one of said set of individual cards consisting of the minimum number thereof to establish the outline of said preselected character; and
  b. a multiplicity of different reading scripts comprising a set thereof corresponding in number to the number of cards in said set of individual cards, each one of said set of different reading scripts being employable solely with a particular one of said set of individual cards, each one of said set of different reading scripts comprising textual material consisting of a story, each of said stories including a multiplicity of instructions for interconnecting said set of individual, differently colored symbols to complete the formation of the character on the corresponding one of said set of individual cards by referring to each one of said set of individual, differently colored symbols by the color thereof in accord with a predetermined sequence corresponding to the same sequence of manipulative movements employed when said character on the corresponding one of said set of individual cards is manually written.

2. The learning kit as set forth in claim 1 wherein said planar member has a square configuration and is made plastic.

3. The learning kit as set forth in claim 1 wherein said preselected character comprises the capital letter A.

4. The learning kit as set forth in claim 1 wherein said preselected character comprises the capital letter B.

5. A learning kit for use by a learning disabilities teacher to teach children having learning disabilities to recognize and to correctly form by writing alphabetical characters comprising:
  a. a multiplicity of individual cards constituting a set thereof, each one of said set of individual cards consisting of a planar member having at least one surface thereof suitable for writing thereon, said one surface of each one of said set of individual cards having the image of a set of individual, differently colored balls provided thereon, each one of said set of individual, differently colored images of balls being located on said one surface of the corresponding one of said set of individual cards in spaced relation relative to each other to form thereon the outline of a preselected one of the letters of the alphabet, said set of individual, differently colored images of balls on said one surface of the corresponding one of said set of individual cards consisting of the minimum number thereof to establish the outline of said preselected one of the letters of the alphabet; and
  b. a multiplicity of different reading scripts comprising a set thereof corresponding in number to the number of cards in said set of individual cards, each one of said set of different reading scripts being employable solely with a particular one of said set of individual cards, each one of said set of different reading scripts comprising textual material consisting of a story, each of said stories including a multiplicity of instructions for interconnecting said set of individual, differently colored images of balls to complete the formation of the preselected one of the letters of the alphabet on the corresponding one of said set of individual cards by referring to each one of said set of individual, differently colored images of balls by the color thereof in accord with a predetermined sequence corresponding to the same sequence of manipulative movements employed when said preselected one of the letters of the alphabet on the corresponding one of said set of individual cards is manually written.

6. The learning kit as set forth in claim 5 wherein said preselected one of the letters of the alphabet comprises the capital letter A.

7. The learning kit as set forth in claim 5 wherein said preselected one of the letters of the alphabet comprises the capital letter B.

8. A method employable by a learning disabilities teacher for teaching children having learning disabilities, manifested by the inability of the children to recognize and to correctly form by writing alphabetical and numerical characters, to learn to recognize and to correctly form by writing a preselected one of a group of characters selected from the alphabetical and numerical characters comprising the steps of:
 a. preparing a card having at least one surface thereof suitable for writing thereon by placing thereon the image of a set of individual, differently colored balls arranged so as to be located in spaced relation relative to each other so as to form the outline of the preselected one of the group of characters;
 b. placing by the learning disabilities teacher of the card having the set of individual, differently colored balls provided thereon before a child having learning disabilities manifested in the inability of the child to recognize and to correctly form by writing alphabetical and numerical characters;
 c. providing by the learning disabilities teacher of a reading script comprising textual material consisting of a story prepared for use solely with the particular card placed before the child having learning disabilities;
 d. reciting to the child having learning disabilities by the learning disabilities teacher the story containing a multiplicity of instructions for interconnecting the set of individual, differently colored balls appearing on the card placed before the child having learning disabilities by referring to each of the set of individual, differently colored balls by the color thereof in accord with a predetermined sequence corresponding to the same sequence of manipulative movements employed when the preselected one of the group of characters is manually written; and
 e. interconnecting by the child having learning disabilities of the set of individual, differently colored balls in accord with the multiplicity of instructions contained in the story recited thereto by the learning disabilities teacher.

* * * * *